United States Patent [19]

Ankenman et al.

[11] 4,058,170
[45] Nov. 15, 1977

[54] FARM IMPLEMENT HINGE RESTRICTOR

[75] Inventors: Thomas W. Ankenman, Tipton; Lee J. Brinker, Glen Elder, both of Kans.

[73] Assignee: Kent Manufacturing Co., Inc., Tipton, Kans.

[21] Appl. No.: 688,136

[22] Filed: May 20, 1976

[51] Int. Cl.² .................. A01B 15/14; A01B 61/00
[52] U.S. Cl. ............................. 172/311; 172/456; 16/190
[58] Field of Search ............... 172/640, 356, 460, 459, 172/776, 456, 126; 16/180, 182, 145, 142, 188, 186, 190; 403/145, 120, 149, 157; 280/411 R

[56] References Cited

U.S. PATENT DOCUMENTS

| 3,340,936 | 9/1967 | Godbersen | 403/145 |
|---|---|---|---|
| 3,486,565 | 12/1969 | Heckathorn | 16/190 |
| 3,490,544 | 1/1970 | Godbersen | 172/662 |
| 3,598,442 | 8/1971 | Miller | 16/190 |
| 3,767,223 | 10/1973 | Bottenberg | 16/180 |
| 3,880,241 | 4/1975 | Vincent | 172/311 |
| 3,990,521 | 11/1976 | Ankenman | 172/311 |

Primary Examiner—Richard J. Johnson
Attorney, Agent, or Firm—Fishburn, Gold & Litman

[57] ABSTRACT

A farm implement of the sectional tow type having at least two rigid frames positioned end-to-end and pivotally interconnected, includes a restrictor apparatus for resisting excessive oscillation between the frames and comprises a fixed and a reciprocating bracket having cooperating faces which are urged abuttingly together by a resilient member. The fixed bracket is attached to and disposed upstanding from one of the frames adjacent to the end thereof, and the reciprocating bracket is connected to the other frame by a linkage mechanism having one end pivotally attached to the reciprocating bracket in a spaced relation to the face thereof and having the other end pivotally attached to the other frame in a spaced relation to the pivotal connection. The resilient member is further compressed from a pre-compressed condition upon pivotal frame motion by the articulate movement of the reciprocating bracket relative to the fixed bracket. The restrictor thereby permits swinging motion between the frames during an operational implement position for conforming the same to the contour of the underlying terrain, and prevents undesirable oscillation between the frames during a transportational implement position.

11 Claims, 5 Drawing Figures

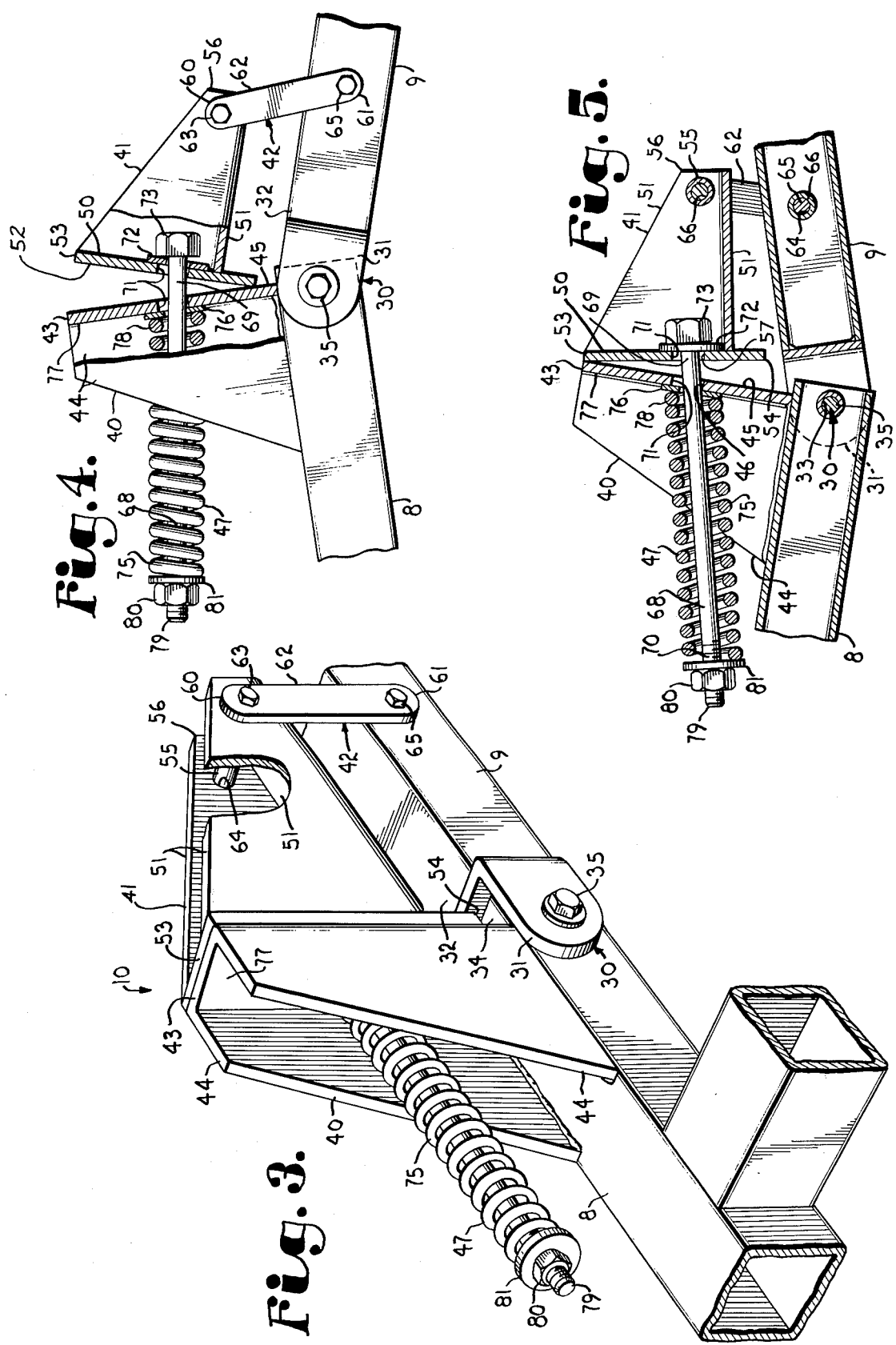

FARM IMPLEMENT HINGE RESTRICTOR

This invention relates to farm implements of the draft type having a central section and a pair of articulated wing sections which are moved from a laterally extended operating position to a trailing position, and more particularly, to an improved connection between portions of the wing section which functions to prevent excessive oscillation while trailing.

While trailing farm implements of the sectional tow type to and from operation sites, the articulated wings thereof tend to oscillate violently thereby damaging the implement and posing a danger to objects and persons in the near vicinity. To avoid these problems, oscillation prevention devices have been suggested, for example see U.S. Pat. No. 3,880,241. However, such arrangements have proven to be costly to manufacture, inconvenient to use, and/or detrimental to the implement's flexibility when used in the field. This invention avoids the noted difficulties by providing a unique connector between the implement wing sections which permits normal articulation in the operating position but substantially dampens oscillation in the trailing position without manual actuation or deactuation.

The principal objects of the present invention are: to provide a spring loaded hinge mechanism between implement wing sections operable to resiliently inhibit oscillations thereof during trailing in the transport position; to provide such a hinge mechanism wherein articulated parallel plates are urged abuttingly together by resilient means for implement stability during trailing and normal articulation during use; to provide such a hinge mechanism wherein the resilient means urging said plates together is adjustable to accomodate various trailing and operating conditions; to provide such a hinge mechanism which is simple and rigid in design for improved safety and extended implement operating life; and to provide such a hinge mechanism which is economical to manufacture and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

FIG. 3 is an enlarged, fragmentary perspective view of the implement particularly showing an oscillation restrictor attached thereto.

FIG. 4 is a fragmentary cross-sectional view of the implement wherein pivotally attached frame members thereof are disposed angularly in a first operational position.

FIG. 5 is a fragmentary cross-sectional view of the implement wherein said frame members are disposed angularly in a second operational position.

Figure 1:
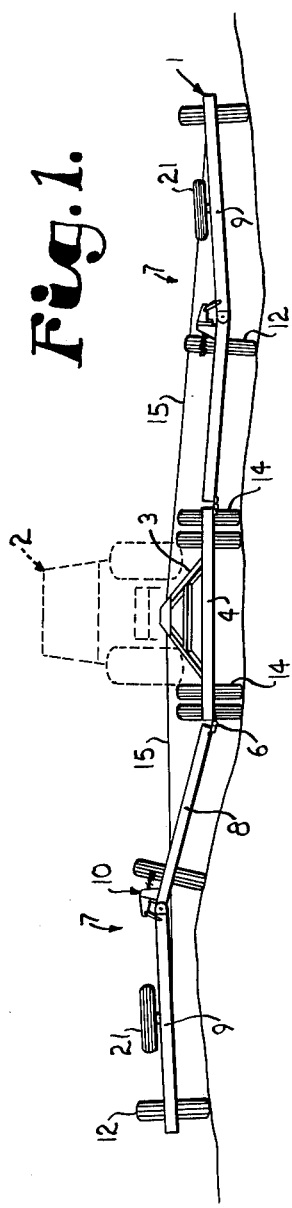
FIG. 1 is a rear elevational view of an implement embodying this invention with tool supporting sections in an operating position.
Figure 2:
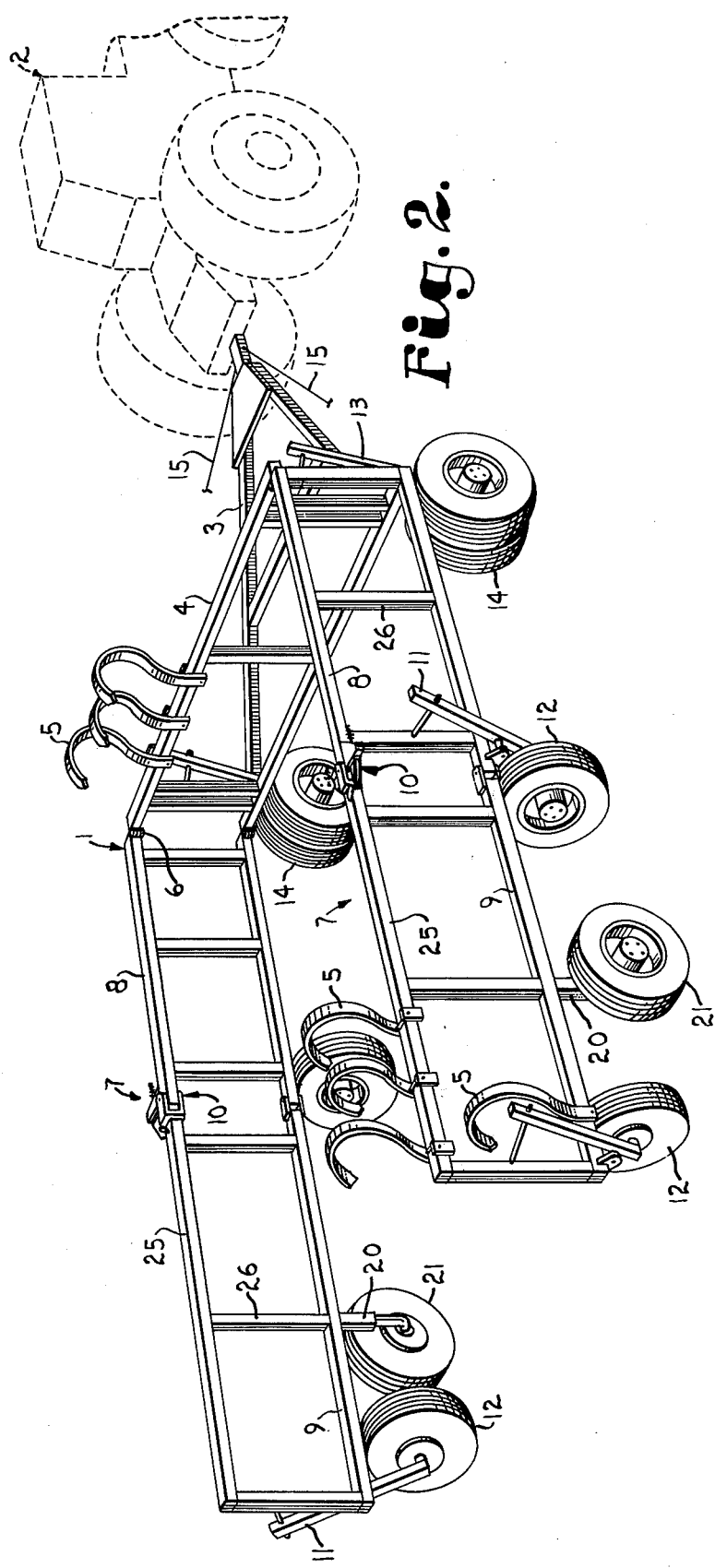
FIG. 2 is a perspective view of the implement with wing sections trailing in a transport position.

An example of an implement embodying the present invention is illustrated generally in FIGS. 1 and 2 by the reference numeral 1 as pulled by a tractor 2 shown by broken lines. The implement includes a conventional, triangular draw-bar 3 connected at the rear thereof to a central implement supporting section 4 which is mounted for powered movement with respect to the draw-bar 3 about a horizontal transverse axis by conventional means (not shown). FIGS. 1 and 2, respectively, illustrate the central section 4 in a horizontal position for a normal operation and in a vertical position for transport. The width of the central section 4 is dictated by practical consideration such as the overall width of the tractor, the roadway, gates, etc. Tillage tools, for example, of the spring tooth type 5, are mounted on the central section 4 to engage the ground when in the operative position. Hinges 6 connect each end of the central section 4 to the inner ends of tillage tool carrying wing sections 7. In this embodiment, each of the wing sections 7 is formed of a pair of frames, the inner frame of each pair being designated 8 and the outer frame 9. An oscillation restrictor generally designated by the numeral 10, is connected between the inner frame 8 and the outer frame 9.

The outer ends of the frames 8 and 9 include forwardly projecting arms 11 to which journaled wheels 12 are attached. Similar arms 13, attached to the central section 4, support journaled wheels 14. The wheels 12 and 14 support the implement, including the central section 4 and the wing sections 7, when the sections are in the operative position.

Cables 15 extend from the tractor hitch portion of the draw-bar 3 to the outer frames 9 and provide support for said frames in the operative position. The cables 15 have a suitable release mechanism (not shown) which permits folding the wing sections for transport.

Each of the outboard frames 9, near the outer end thereof, has a forwardly projecting wheel mount 20 which supports a journaled wheel 21 thereon. The arrangement is such that, in the transport position as illustrated in FIG. 2, wheel 21 is in an extended position at a level lower than the adjacent wheel 12, whereby the wheels 21 will engage the ground and elevate wheels 12 away from ground contact. In the operative position as illustrated in FIG. 1, wheels 12 support the implement while wheels 21 swing, with the outer frames 9, away from ground contact.

In the representation of FIG. 2, horizontal structural members 25 are connected together in a spaced, parallel relation by structural cross members 26 forming the structure of the wing frames 8 and 9. The oscillation restrictor 10 is connected to adjacent ends of horizontal members 25 and functions to urge the frame pairs 8 and 9 to an in-line position.

The inner and outer frame members 8 and 9 are connected for flexible movement therebetween such that they readily conform to the underlying terrain during the operational mode. In the illustrated structure, frame members 8 and 9 are pivotally connected for swinging motion from an in-line position by a hinge assembly 30. A pair of spaced ears 31 are attached to and project from the end 32 of frame member 9 and include aligned transverse apertures 33 therethrough. The cooperating end 34 of frame member 8 is provided with a mating aperture through which a hinge pin 35 is disposed and retained.

The oscillation restrictor 10 comprises a fixed bracket 40 attached to the frame 8 adjacent the end 34 thereof, and a reciprocating bracket 41 pivotally attached to outer frame 9 adjacent to the end 32 thereof by a linkage mechanism 42. The fixed bracket 40 comprises a rigid faceplate 43 and a pair of spaced apart gussets or side walls 44 attached to and upstanding from inner frame 8. The fixed bracket 40 is attached to the inner frame 8 by suitable fastening means such as U-bolts (not shown), welding, or the like. The faceplate 43 includes a flat exterior surface 45 disposed adjacent to the pivotal joint 30 and which lies in a plane substantially parallel to the central axis of the hinge pin 35. The faceplate 43 includes an aperture 46 therethrough adapted for receiving resilient means 47 therein.

The reciprocating bracket 41 includes a faceplate 50 engaging fixed bracket faceplate 43, and a pair of braces 51 extending therefrom in a direction toward frame member 9. The faceplate 50 includes a flat surface 52 which mates with the surface 45 of the fixed bracket 40, a first or upper end edge 53, and a second or lower end edge 54. A support member, such as sleeve 55, is provided between and attached to the braces 51 adjacent an outwardly end 56 thereof. An aperture 57 is disposed through faceplate 50 and is in substantial alignment with aperture 46.

The linkage mechanism 42 has a first or upper end 60 pivotally attached to the reciprocating bracket 41 in a spaced relation to the plate 50 thereof, and a second or lower end 61 thereof pivotally attached to frame member 9 in a spaced relation to the pivotal joint 30. In the illustrated structure, linkage mechanism 42 comprises a pair of straps 62 disposed on either side of frame member 9 to facilitate equal load distribution. The upper ends 60 of the strap are provided with aligned, transverse apertures therethrough which mate with sleeve 55 and are connected by a pin 63 disposed and retained therein. Similarly, the lower end 61 of each strap 62 includes a transverse aperture 64 therethrough which mates with a pivot pin 65 disposed within the frame aperture 66.

The resilient means 47 urges the fixed and reciprocating bracket faces 45 and 52 abuttingly together to prevent excessive frame oscillation while trailing and is preferably precompressed. An elongated member such as a rod 68 is positioned through bracket apertures 46 and 57 having the left and right hand portions 69 and 70 respectively projecting therefrom. The elongated member 68 is sized in correspondence with bracket apertures 46 and 57 whereby a gap or an annular space 71 exists between said members such that the rod can pivot freely therein. In this examle, elongate example, right hand portion 69 is provided with a retainer such as a washer 72 and a bolt head 73 and the left hand portion 70 thereof impales an elongated, longitudinally resilient member such as helical compression spring 75. A washer 76 is disposed about the rod 68 between an interior surface 77 of faceplate 43 and an interior end 78 of the spring 75. The outermost rod end 79 is threaded and engaged by a spring retainer such as nut 80 and washer 81, which when rotated relative to the rod provide an adjustable compression preset for the oscillation restrictor.

When the farm implement is in the trailing position, the inner and outer frames 8 and 9 of each wing section are held in a stable, in-line relationship by the oscillation restrictor. The compression spring 75 urgingly maintains the abutment of faceplates 43 and 50 thereby restricting the oscillation of the wings.

When the farm implement is in the operating position the oscillation restrictor permits articulation between the frame members for readily conforming the same to the contour of the underlying terrain. As the frame members 8 and 9 are rotated into an inverted "V" relationship by ground undulations, the link mechanism transmits said swinging movement to the reciprocating bracket 41 and rotates the same about the lower edge 54 thereof relative to the fixed bracket faceplate 43. This rocking motion causes the divergence of retainer 23 and washer 76 thereby further compressing the precompressed spring member 75. As the ground terrain causes the frame members 8 and 9 to assume a V-shaped relationship, the reciprocating bracket 41 is rotated about the upper end edge 53 thereof relative to fixed bracket 40. Again, said rocking motion simply compresses the spring member 75 thereby allowing the free relative rotation of the frame members of each wing section and permitting normal tillage movement.

It is to be understood that while certain forms of this invention have been illustrated and described, it is not to be limited to the specific form or arrangement of parts herein described and shown, except insofar as limitations are included in the following claims.

What is claimed and desired to secure by Letters Patent is:

1. In a farm implement of the foldable tow type having at least two rigid frames positioned end-to-end and connected by a pivotal joint for relative swinging motion about an axis of rotation, a restrictor for preventing excessive oscillation between said frames, said restrictor comprising:
    a. a fixed bracket attached to one of said frames and having a face disposed substantially normal to said one frame and positioned adjacent to said pivotal joint;
    b. a reciprocating bracket having a face, said reciprocating bracket face engaging said fixed bracket face and extending therefrom in a direction toward the other frame;
    c. linkage having a first end thereof pivotally attached to said reciprocating bracket in a spaced relation to the face thereof and having a second end thereof pivotally attached to said other frame in a longitudinally spaced relation with said pivotal joint; and
    d. means spaced from said linkage and engaging said fixed bracket and said reciprocating bracket for resiliently urging said fixed and reciprocating bracket faces abuttingly together.

2. A farm implement of the foldable tow type comprising:
    a. a wheeled center section supporting tillage tools and pivotable about a transverse axis between a generally horizontal operational position and a generally vertical transport position;
    b. a pair of wheeled wing sections adapted to support tillage tools thereon and respectively positioned at opposite ends of said central section, hinges connecting each of said wing sections to said central section whereby said wing sections are movable with said central section between said positions;
    c. said wing sections each comprising at least two rigid frames positioned end-to-end;
    d. means connecting said frames for flexible movement of one frame relative to the adjacent frame;
    e. means restricting said flexible movement comprising:
        1. a fixed bracket attached to one of said frames and having a face disposed adjacent to said connecting means;
        2. a reciprocating bracket having a face; said reciprocating bracket face engaging said fixed bracket face and extending therefrom in a direction toward the other frame;

3. linkage having a first end thereof pivotally attached to said reciprocating bracket in a spaced relation to the face thereof and having a second end thereof pivotally attached to said other frame in a spaced relation with said connecting means; and 4. resilient means urging said fixed and reciprocating bracket faces abuttingly together.

3. A restrictor as set forth in claim 2 wherein:
a. said connecting means comprises a hinge assembly and includes a hinge pin.

4. A restrictor as set forth in claim 3 wherein:
a. said frames include interconnected beams;
b. one of said beams has spaced ears respectively projecting over one end of one of said frames; and
c. said hinge pin extends through said ears and said frame end.

5. A restrictor as set forth in claim 3 wherein:
a. one of said brackets includes an aperture through the face thereof;
b. said other bracket includes an elongated member having one end thereof pivotally attached to said other bracket face and being positioned through said one face aperture;
c. said resilient means comprises a coil spring having a first end thereof connected with said one bracket and a second end thereof being connected with the other end of said elongated member; and
d. said bracket faces are flat and lie in a plane disposed substantially parallel to said axis of rotation.

6. In a farm implement of the foldable tow type having at least two rigid frames positioned end-to-end and connected by a pivotal joint for relative swinging motion about an axis of rotation, a restrictor for preventing excessive oscillation between said frames, said restrictor comprising:
a. a fixed bracket attached to one of said frames and having a face disposed adjacent to said pivotal joint;
b. a reciprocating bracket having a face, said reciprocating bracket face engaging said fixed bracket face and extending therefrom in a direction toward the other frame, said fixed and reciprocating bracket faces being flat and lying in a plane disposed substantially parallel to said axis of rotation;
c. linkage having a first end thereof pivotally attached to said reciprocating bracket in a spaced relation to the face thereof and having a second end thereof pivotally attached to said other frame in a spaced relation with said pivotal joint; and
d. resilient means urging said fixed and reciprocating bracket faces abuttingly together.

7. In a farm implement of the foldable tow type having at least two rigid frames positioned end-to-end and connected by a pivotal joint for relative swinging motion about an axis of rotation, a restrictor for preventing excessive oscillation between said frames, said restrictor comprising:
a. a fixed bracket attached to one of said frames and having a face disposed adjacent to said pivotal joint;
b. a reciprocating bracket having a face, said reciprocating bracket face engaging said fixed bracket face and extending therefrom in a direction toward the other frame;
c. means on one of said fixed bracket and reciprocating bracket defining an aperture through the face thereof;
d. an elongated member having one end thereof pivotally attached to the other of said fixed bracket and reciprocating bracket and being positioned through said one face aperture;
e. linkage having a first end thereof pivotally attached to said reciprocating bracket in a spaced relation to the face thereof and having a second end thereof pivotally attached to said other frame in a spaced relation with said pivotal joint; and
f. resilient means urging said fixed and reciprocating bracket faces abuttingly together, said resilient means having a first end thereof connected with said one bracket and a second end thereof connected with the other end of said elongated member.

8. A resistor as set forth in claim 7 wherein:
a. said resilient means comprises a coil spring.

9. A restrictor as set forth in claim 7 wherein:
a. said resilient means comprises a compression member having a central, axial aperture therethrough;
b. said elongated member impales said compression member and has a threaded end thereof disposed adjacent to said resilient means second end; and including
c. a threaded retaining member cooperatively engaging said elongated member threaded end whereby relative rotational motion therebetween provides an adjustable compression preset for said compression member.

10. In a farm implement of the foldable tow type having at least two rigid frames positioned end-to-end and connected by a pivotal joint for relative swinging motion about an axis of rotation, a restrictor for preventing excessive oscillation between said frames, said restrictor comprising:
a. a fixed bracket attached to one of said frames and having a face disposed adjacent to said pivotal joint;
b. a reciprocating bracket having a face, said reciprocating bracket face engaging said fixed bracket face and extending therefrom in a direction toward the other frame;
c. means on each of said fixed bracket and reciprocating bracket defining an aperture through the face thereof, said apertures each being defined by a marginal edge and being in substantial alignment;
d. an elongated member positioned through said apertures and a gap existing between said elongated member and said marginal edges whereby said elongated member pivots therein, said elongated member having first and second outermost ends projecting from each bracket aperture;
e. linkage having a first end thereof pivotally attached to said reciprocating bracket in a spaced relation to the face thereof and having a second end thereof pivotally attached to said other frame in a spaced relation with said pivotal joint;
f. resilient means urging said fixed and reciprocating bracket faces abuttingly together, said resilient means comprising a compression member being impaled by one of said elongated member ends; and
g. retaining means connected with each of said elongated member ends whereby the swinging motion compresses said compression member.

11. In combination:

a. a first member and a second member positioned end-to-end and connected by a pivotal joint for relative swinging motion about an axis of rotation;

b. a fixed bracket attached to one of said members and having a face positioned adjacent the pivotal joint;

c. a reciprocating bracket adjacent the other of said members and having a face engaging said fixed bracket face and extending therefrom in a direction toward said other member;

d. linkage having a first end thereof pivotally attached to said reciprocating bracket in a spaced relation to the face thereof and having a second end thereof pivotally attached to said other member in a spaced relation with said pivotal joint; and e. means spaced from said linkage and engaging said fixed bracket and said reciprocating bracket for resiliently restricting relative swinging motion of said first and second members and for resiliently urging said fixed and reciprocating bracket faces abuttingly together.

* * * * *